No. 789,233.                                                                                         Patented May 9, 1905.

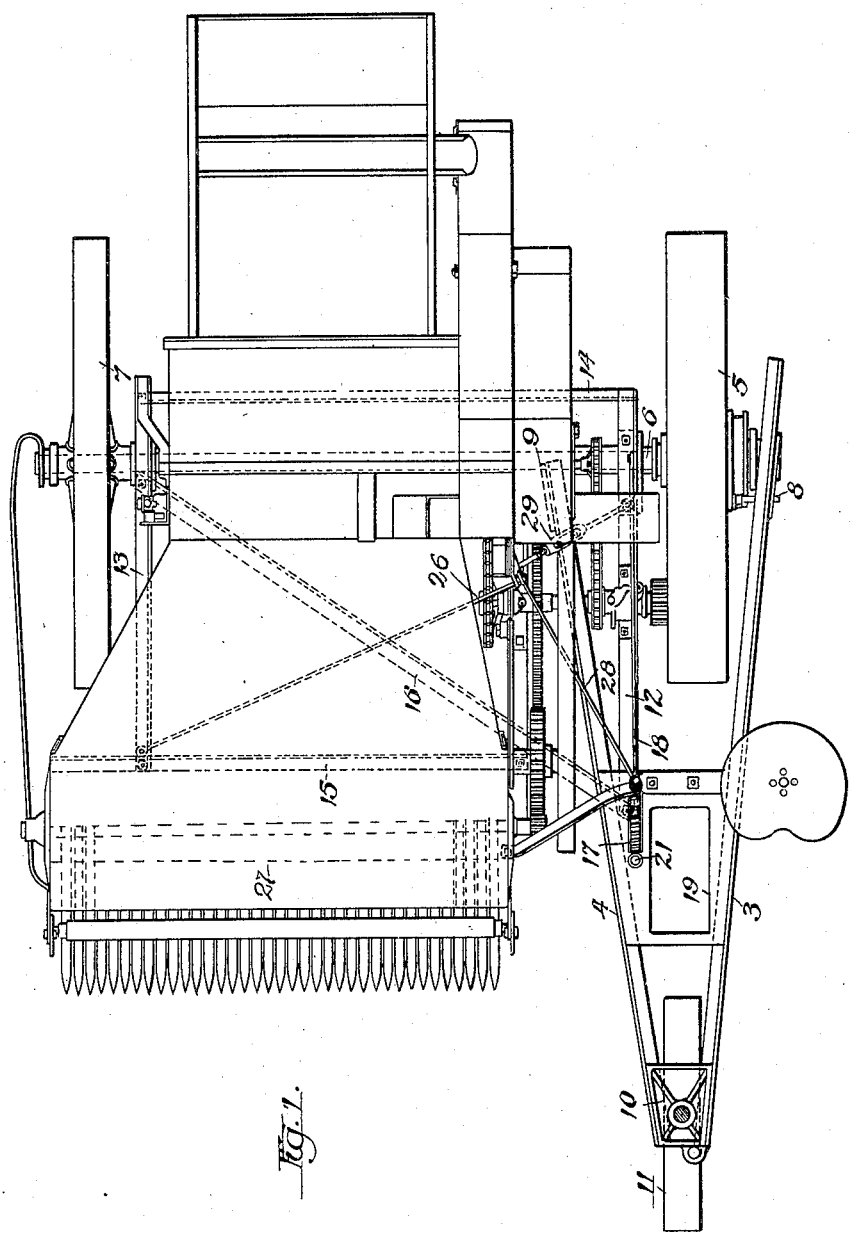

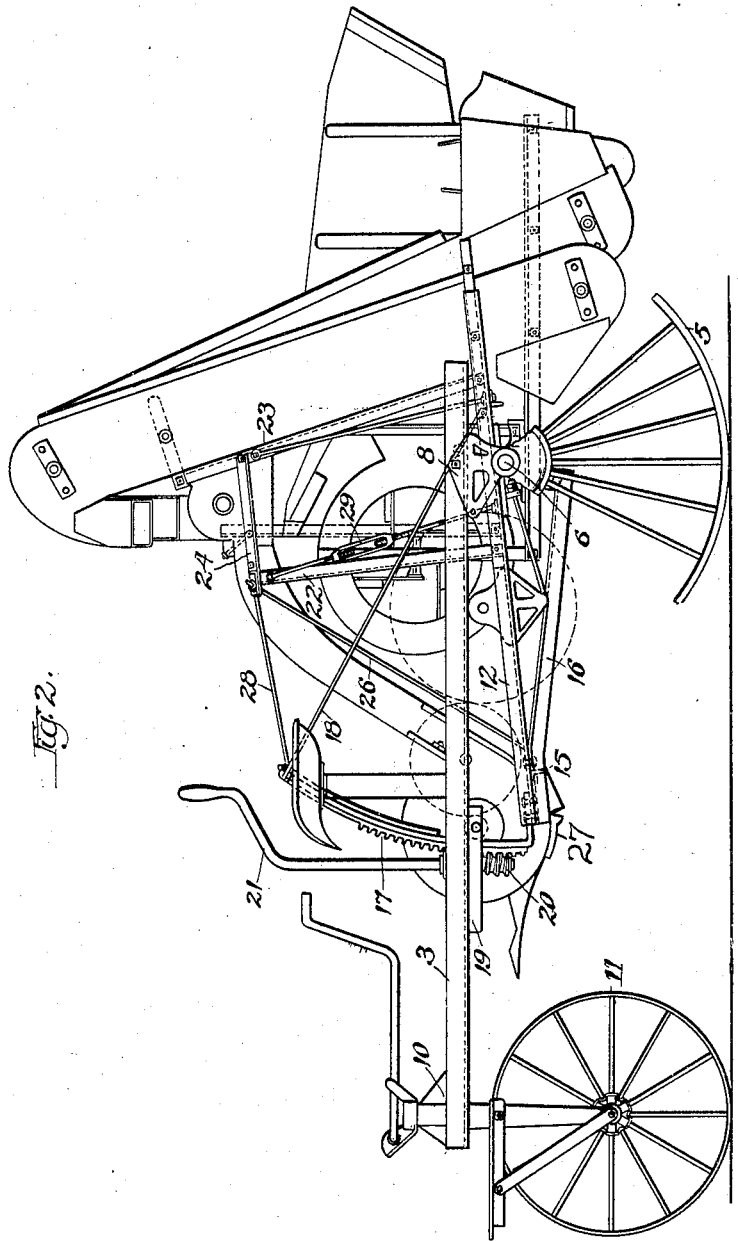

UNITED STATES PATENT OFFICE.

CHARLES A. ANDERSON RAND, OF CHICAGO, ILLINOIS, ASSIGNOR TO INTERNATIONAL HARVESTER COMPANY, A CORPORATION OF NEW JERSEY.

STRIPPER-HARVESTER.

SPECIFICATION forming part of Letters Patent No. 789,233, dated May 9, 1905.

Application filed February 23, 1905. Serial No. 246,841.

*To all whom it may concern:*

Be it known that I, CHARLES A. ANDERSON RAND, a citizen of the United States, residing at Chicago, in the county of Cook and State of Illinois, have invented certain new and useful Improvements in Stripper-Harvesters, of which the following is a specification, reference being had to the accompanying drawings, forming a part thereof.

My invention relates to that class of harvesting-machines commonly called "stripper-harvesters," by which the heads of the grain are stripped from the stalks and elevated to suitable threshing, cleaning, and separating mechanism and the grain delivered to a receiving-receptacle.

The objects of the invention are to improve the construction of the wheel-frame and the adjustable frame connected therewith that directly supports the stripping and threshing mechanism in a manner to render it more rigid and strong to withstand the severe shocks to which the above class of machines is often subjected; to provide adjustable connections between the vertical and horizontal portions of said frame, whereby the several parts may be maintained in proper alinement, and to reduce the cost of such parts by means of their simplified construction. These objects are attained by the mechanism shown in the drawings, and described by the specification accompanying this application, in which—

Figure 1 is a plan view of so much of a stripper-harvester as is thought sufficient to convey a clear idea of the nature of my invention to those skilled in the art to which it appertains, and Fig. 2 is a side elevation of the same.

The same reference-numerals denote like parts in both the illustrations.

The draft or main wheel frame consists, in part, of the frame-bars 3 and 4, located upon opposite sides of the main wheel 5, that is journaled upon an axle 6, upon which at its grainward end is journaled the grain-wheel 7. The frame-bars 3 and 4 are secured at their rear ends to parts 8 and 9, that are supported on the axle 6 and extend forward in converging lines and are joined at their forward ends to a spacing-bracket 10, in which is journaled the vertical stem of a yoke carrying the supporting caster-wheel 11. Below the wheel-frame and supported upon the axle 6 is a tilting bed-frame having the side sills 12 and 13, rear and front cross-sills 14 and 15, and the diagonal sill 16, extending from the grainward-side sill in proximity to the axle and joined to the forward end of the stubbleward-side sill 12. A sector-rack 17, concentric with the axle 6, is secured at its lower end to the forward end of side sill 12 and has its upper end connected with the rear end of said sill by means of the brace-rod 18.

A plate-casting 19 is secured between the converging wheel-frame bars 3 and 4 and forms a guide for the tilting sector-rack and also a support for a worm 20, operatively connected with the tilting sector-rack and having a vertical crank-shaft 21, by which it is operated. Upon the tilting bed-frame are secured vertical frame members 22 and 23, forming, in part, the supports for the elevating and threshing mechanism. The upper end of the vertical frame member 22 is connected with the upper end of 23 by means of the bar 24 and with the forward end of the side sill 13 by means of the brace-rod 26 in a well-known way.

When constructed in the manner as above described, it has been found that there was not sufficient rigidity of the assembled parts; that the grainward end of the stripper-bar 27, supported upon the forward end of the tilting bed-frame, was not supported properly and was liable to sag under the strain of operation and become permanently disarranged with no adequate provision for readjustment. To prevent so far as possible the above-noted disarrangement of parts and to provide a suitable means for readjustment, a connecting-brace 28 is secured to the upper ends of the sector-rack 17 and the vertical frame member 22, and a two-part brace-rod, having a turnbuckle 29 connecting its inner ends and having its outer ends connected to the bed-frame and the upper end of the vertical frame member 22, forms a longitudinally extensible or retractable brace by means of which any accidental or otherwise shifting of the horizontal stripper mechanism relative to the wheel-frame may be corrected.

The stripping and threshing mechanism may be made in any of the usual forms, and I make no claim for such parts.

What I claim, and desire to secure by Letters Patent, is—

1. In a stripper-harvester, the combination of a main drive-wheel, a grain-wheel, an axle, a wheel-frame mounted upon the axle, a tilting bed-frame also mounted upon the axle, stripping, elevating and threshing mechanism carried by said tilting frame, vertical supports secured to the bed-frame and sustaining said elevating and threshing mechanism, and a longitudinally extensible retractable brace connection between the vertical supports and said bed-frame whereby the relative position of the parts may be adjusted.

2. In a stripper-harvester, the combination of a main drive-wheel, a grain-wheel, an axle, a wheel-frame mounted upon the axle, a tilting bed-frame also mounted upon the axle, stripping, elevating and threshing mechanism carried by said tilting frame, said tilting bed-frame comprising in part longitudinal side sills upon opposite sides of the elevating and threshing mechanism, transverse cross-sills connecting the rear and front ends of the frame, vertical frame members secured at their lower ends to the side sills and supporting the elevating and threshing mechanism, a connection between the upper ends of the vertical members, and an adjustable connection between the upper part of the vertical frame and the bed-frame, whereby a proper alinement of parts is maintained.

3. In a stripper-harvester, the combination of a main wheel, a grain-wheel, an axle, a wheel-frame mounted upon the axle, a tilting bed-frame also mounted upon the axle, a sector-rack secured to the front stubbleward corner of the tilting frame and projecting through guides attached to the wheel-frame, a brace extending rearward and downward from the upper end of the sector-rack to the tilting bed-frame, stripping, elevating and threshing mechanism, vertical frame members sustaining said mechanism and having their lower ends secured to the tilting bed-frame, a brace-rod connecting the upper end of one of the vertical frame members and the upper end of said sector-rack and an adjustable connection between the upper end of said vertical frame member and the bed-frame whereby a proper alinement of parts is maintained.

In witness whereof I hereto affix my signature in presence of two witnesses.

CHARLES A. ANDERSON RAND.

Witnesses:
  OSCAR A. ANDERSON,
  SIDNEY W. NICHOLLS.